C. H. Knox's

2840 Wringer.

Reissued

Jan 14 1868 witnesses

G. L. Chapin

A. Hayward inventor.

C. H. Knox

By his attorney

G. L. Chapin

United States Patent Office.

C. H. KNOX, OF MOUNT PLEASANT, IOWA.

*Letters Patent No.* 66,362, *dated July* 2, 1867; *reissue No.* 2,840, *dated January* 14, 1868.

IMPROVED CLOTHES-WRINGER.

The Schedule referred to in these Letters Patent and making part of the same.

TO ALL WHOM IT MAY CONCERN:

Be it known that I, C. H. KNOX, of Mount Pleasant, in the county of Henry, in the State of Iowa, have invented an Improved Clothes-Wringer; and I do hereby declare that the following is a full and exact description thereof, reference being had to the accompanying drawings, and to the letters of reference marked thereon, making a part of this specification, in which—

Figure 1:
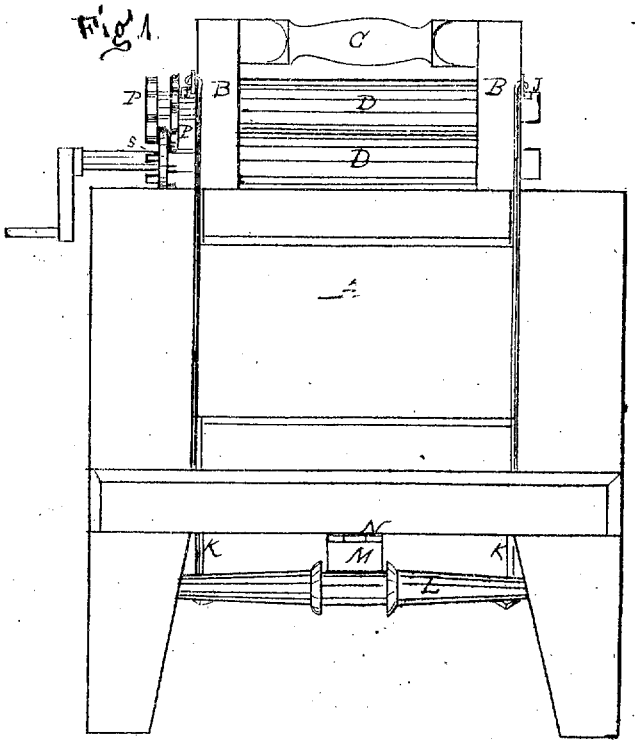

Figure 1 is an elevation of my invention as attached to the end of a washing-machine.

Figure 2:
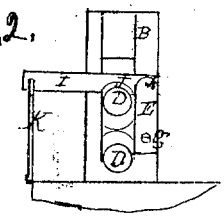

Figure 2, an elevation of the end of wringer, showing the lever which holds the rollers together, and a part of the connecting-rod.

Figure 3:
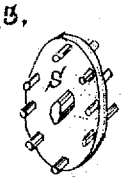

Figure 3, a perspective representation of the lower cog-wheel.

Figure 4:
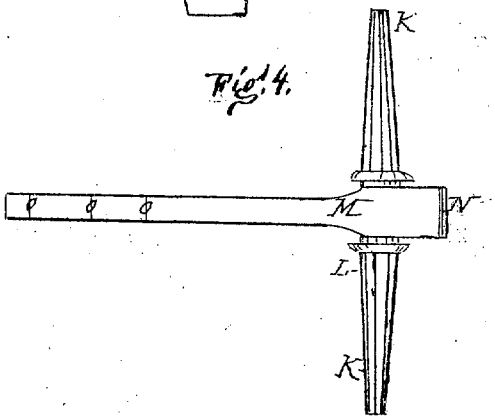

Figure 4, a plan view of the suspended roller, and the lever to which the weight for regulating the pressure of the rollers is applied.

Figure 5:
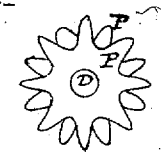

Figure 5, an elevation of the double cog-wheel which is used in combination with wheel shown at fig. 3 in turning the rollers of the wringer.

The nature of my invention consists, first, in the use of pivoted levers made to bear upon the ends of the upper roller of the wringer by means of connecting-rods attached to said levers, and a suspended roller at or near the bottom of a washing-box, and a weighted lever attached to the end of the bottom of said box bearing upon said roller, by which means both ends of the upper roller will be held against the lower roller with the requisite and equal force, whether the articles to be wrung are put in the centre or near either end, which cannot be so well accomplished when rubber or metallic springs are used; second, in the use of an upper double cog-wheel and a double central pinion, the former having cogs occupying alternate spaces, and the latter being arranged to mesh in said double cog-wheel, and move the rollers of the wringer, notwithstanding said rollers be forced a greater or less distance apart, as when wringing heavy or light articles. This latter arrangement is important, for the single cog-wheel is found to be insufficient to turn the rollers, especially when they are closed together or set far apart, because, in the former case the cogs are apt to bind, and in the latter to be thrown out of gear.

I claim that the use of my double cog-wheel will obviate the above-named difficulty, and work equally well when set at various distances apart, so long as the cogs are in mesh.

In order to enable others skilled in the art to make and use my invention, I have marked corresponding parts with similar letters, and will now give a detailed description.

A, fig. 1, represents the end of a common washing-machine, to which my wringer is attached. B C show the frame, and D the rollers of a common wringer, the ends, B, being attached to box A in the usual manner. E, fig. 2, represents a metallic plate, two of which are used, one at each end of the wringer, and rigidly attached to the parts B by a screw, *g*, or otherwise, as most convenient. These plates E are pivoted at *h* to levers I, which have circular bearings, J, (figs. 1 and 2,) made to fit the ends of upper roller D, and hold it in position against the lower roller D. Connecting-rods, K, are secured to levers I, and extend downward to a point a little below the bottom of box A, and are attached to a roller, L, figs. 1 and 4. A lever, M, is hinged to box A at N, and is made to bear upon roller L and force it downward, by which means the levers I are made to press upon the ends of upper roller D and hold it with suitable force against lower roller D. It will be seen that lever M projects longitudinally under the box A, and has common notches, *o*, in its top, by which means said lever is not in the way, and can have a suitable weight hung in either of said notches and regulate the pressure of said levers I upon rollers D, as may be desired, for the purpose of wringing. B B represent the upper double cog-wheel, and S the double pinion used to operate rollers D. It will be seen at figs. 1 and 5 that the cogs of the upper wheel are made to occupy alternate spaces, and that double pinion S, fig. 3, is arranged to mesh into said cogs, and thus form a complete gearing having alternate bearings.

I am not particular as to the material used, but prefer galvanized iron, it being cheap, and not liable to rust.

Having thus described my invention, what I claim, and desire to secure by Letters Patent, is—

1. The double cog-wheel P, and double pinion S, substantially as set forth.

2. The combination of cog-wheel P and pinion S with rollers D D, substantially as and for the purpose set forth.

3. The arrangement and combination of lever M, hinged to box A, roller L, rods K, levers I, and plate C, arranged to operate upper roller D, as set forth.

C. H. KNOX.

Witnesses:

GEO. L. CHAPIN,

A. HAYWARD.